United States Patent [19]

Yokoyama et al.

[11] Patent Number: 5,192,568
[45] Date of Patent: Mar. 9, 1993

[54] CAVITY FORMING AGENT FOR EDIBLE FOODS

[75] Inventors: Kazuaki Yokoyama, Chiba; Kiyomi Taniguchi, Koshigaya; Hisao Sekiguchi, Tokyo; Tomiatsu Kaneko, Ichikawa, all of Japan

[73] Assignee: Myoshi Oil & Fat Co., Ltd., Tokyo, Japan

[21] Appl. No.: 811,717

[22] Filed: Dec. 20, 1991

Related U.S. Application Data

[63] Continuation-in-part of Ser. No. 585,775, Sep. 20, 1990, abandoned.

[30] Foreign Application Priority Data

Sep. 22, 1989 [JP] Japan .................................. 1-247429

[51] Int. Cl.$^5$ ............................................ A21D 13/00
[52] U.S. Cl. ..................................... 426/94; 426/138; 426/281; 426/283; 426/549; 426/556; 426/602
[58] Field of Search ............... 426/549, 106, 112, 143, 426/279, 280, 282, 283, 512, 514, 556, 576, 94, 602, 138, 281

[56] References Cited

U.S. PATENT DOCUMENTS 4,104,413 8/1978 Wynn et al. .................. 426/582

FOREIGN PATENT DOCUMENTS 54-145242 5/1978 Japan .
56-68337 11/1979 Japan .
5942837 3/1984 Japan .................. 426/549

Primary Examiner—Joseph Golian
Assistant Examiner—Leslie Wong
Attorney, Agent, or Firm—Willian Brinks Olds Hofer Gilson & Lione

[57] ABSTRACT

A composition for use in cavity foods as breads, cakes and other cavity foods suitable for filling to prevent softening of their dough by forming uniform cavities and forming films preventing the transfer of water and oil thereto on filling is disclosed. The composition comprises (by weight) 10% to 30% of edible oils and fats, 1% to 15%, preferably 1% to 10% proteins, 1% to 10% of polysaccharides, 0.1% to 5% phosphates, citrates or mixtures thereof, and 40% to 88% water.

6 Claims, No Drawings

CAVITY FORMING AGENT FOR EDIBLE FOODS

CROSS REFERENCE TO RELATED APPLICATION

This case is a continuation-in-part application of Ser. No. 07/585,775, filed Sep. 20, 1990, now abandoned, the disclosure of which is hereby incorporated by reference.

BACKGROUND OF THE INVENTION

The present invention relates to a cavity forming agent, particularly for application to the making of bread, cakes and other cavity foods suitable for filling. The agent prevents softening of bread dough by forming uniform cavities and films for preventing the transfer of water and oil thereto on filling.

Conventionally, pocket bread, English muffin bread, hot dogs buns, bread for sandwiches and various other kinds of bread have been used for cooking. Apart from pocket bread, they however, these types of bread require cutting when a filling is inserted. If the filling has a high water content, it penetrates the bread, softening it, and causes faults such as deterioration of the taste when the bread is left for a long time. In order to prevent this, butter or margarine is applied to the inside of the bread. Pocket bread has a space called a pocket for filling. However, such bread takes a number of hours to make and, if the filling has a high water content, much the same problem as described above arises.

Several methods are known for making cavity bread that reduces the transfer of water and oil by solving the above problem, including baking flattened bread dough during fermentation (Japanese Patent Application Laid-Open No. 145242/1979), and making cavity bread by wrapping an air-containing material such as marshmallow in bread dough before baking (Japanese Patent Application Laid-Open No. 68337/1981).

However, bread with good cavities has never been obtained using conventional techniques. When the former method is used, uniform cavities cannot be obtained, and the bread dough itself forms cavity surfaces. This causes the transfer of water inside (called "crumb part" hereinafter) softening the bread and impairing the taste. The latter method was the disadvantage of requiring an extra equipment and a separate process for separately making the air-containing material. Moreover, when marshmallow is used, since it contains sugar, its taste may not match that of the filling.

Thus, bread with the cavities obtained using conventional techniques does not have uniform cavities and cannot be used for other than specific kinds of filling.

The inventors previously published a method of making cavity bread for solving such problems (Japanese Patent Application Laid-Open No. 42837/1984).

This method has solved the problems of conventional techniques. However, since proteins are used in large amounts, hard films form, affecting the taste of the bread. Furthermore, upon filling, the transfer of water to the crumb part cannot be prevented.

The invention was developed to solve these problems. It is intended to provide a cavity forming agent which, when used to make bread, cakes and other such foods, forms uniform cavities and prevents the transfer of water and oil to the crumb part on filling, enabling the use of various fillings.

SUMMARY OF THE INVENTION

The inventors eagerly studied how to solve the problems described above and, as a result, developed a cavity forming agent which makes the cavity foods suitable for filling. The invention forms uniform cavities and prevents the crumb part from softening by forming films for preventing the transfer of water and oil from the filling into the cavities.

DETAILED DESCRIPTIONS OF THE INVENTION AND PREFERRED EMBODIMENTS

The cavity forming agent according to the invention has a composition by weight of 10% to 30% edible oils and fats, 1% to 15%, preferably 1-10%, proteins, 1% to 10% polysaccharides, 0.1% to 5% phosphates, citrates, or mixtures thereof, and 40% to 88% water.

Cited among the edible oils and fats to be used for the invention are animal oils and fats such as beef tallow, lard, etc.; solid vegetable oils and fats such as coconut oil, palm oil, palm kernel oil, etc.; liquid vegetable oils and fats such as soybean oil, rapeseed oil, cottonseed oil, safflower oil, peanut oil, rice bran oil, etc.; the hydrogenated oils and fats obtained from the above animal and vegetable oils and fats; hydrogenated fish oils; the solid oils and fats obtained by fractionating the above solid animal and vegetable oils and fats and hydrogenated oils and fats or fractionated liquid oils; and the ester-interchange oils and fats obtained by subjecting one or more of the above to ester exchange animal or vegetable oils and fats or hydrogenated oils and fats. One of such edible oils and fats can be used alone, or more than one of the above can be mixed.

Cited among the proteins to be used for the invention are rennet casein, sodium caseinate, acid casein, soybean protein, wheat protein, skim milk powder, etc. One such protein can be used alone, or more than one of the above can be mixed.

Cited among the polysaccharides to be used for the invention are locust bean gum, guar gum, carrageenan, Arabic gum, Xanthan gum, tamarind seed gum, alginic acid, sodium alginate, pectin, cornstarch, potato starch, sweet potato starch, rice starch, wheat starch, chemically-processed starches such as phosphated and hydrolyzed starch, etc. One such polysaccharides can be used alone, or more than one of the above can be mixed.

Cited among the phosphates to be used for the invention are disodium phosphate, trisodium phosphate, tetrasodium phosphate, sodium hexametaphosphate, sodium tripolyphosphate, monosodium diphosphate, disodium diphosphate, trisodium diphosphate, tetrasodium diphosphate, sodium pyrophosphate, dipotassium phosphate, tripotassium phosphate, tetrapotassium phosphate, sodium aluminum phosphate, etc. Sodium citrate is cited among the citrates. At least one of these phosphates and citrates can be selected for use in this invention.

The cavity forming agent according to the invention is composed of edible oils and fats, proteins, polysaccharides, phosphates and/or citrates, and water, preferably with a composition by weight of 10% to 30% by weight edible oils and fats, 1% to 15%, preferably 1-10%, protein, 1% to 10% polysaccharides, 0.1% to 5% phosphates and/or citrates, and 40% to 88% water.

When edible oils and fats are less than 10% by weight, the composition according to the invention becomes liquid and can not easily be wrapped in bread dough. When the oils and fats are more than 30% by weight, they make oil off easily. When proteins are less than 1% by weight, the film formability decreases so that no uniform cavities are formed. When they are more than 15% by weight, hard, distasteful films are formed. When polysaccharides are less than 1% by weight, even-thickness films cannot be formed easily so cavities break in some cases on baking. When they are more than 10% by weight, films of uneven-thickness are formed. When phosphates and citrates are less than 0.1% by weight, the composition according to the invention does not emulsify well and the edible oils and fats and/or water separate readily. When they are more than 5% by weight, they taste extremely bitter even though it emulsifies constantly. When water is less than 40% by weight, the composition accumulates at the bottom of cavities, obstructing formation of even-thickness films after baking. When it is more than 88% by weight, the composition becomes liquid at normal temperature, and cannot easily be wrapped in bread dough.

Edible emulsifiers, salt, flavors, colorants, spices, etc. can be added, if necessary, to the cavity forming agent according to the invention, preferably at a total ratio of less than 5% by weight.

Cited among the edible emulsifiers to be used if necessary are monoglycerides, diglycerides, lecithin, propylene glycol esters, sorbitan ester, sucrose ester, etc. Cited among such flavors are natural and/or synthetic cheese, butter and milk flavors, etc. Cited among such colorants are $\beta$-carotene, annatto yellow, paprika orange, etc. Cited among such spices are curry powder, mustard, wasabi (Japanese horseradish), etc.

Described next is the method of making the cavity forming agent according to the invention.

First a given amount of proteins, polysaccharides, phosphates or citrates are dissolved in water. In order to accelerate dissolution of proteins and polysaccharides, the mixture solution should be heated to 70° C. to 90° C. Next, after adding edible oils and fats, it is stirred using a homomixer or homogenizer while hot. After it is uniformly emulsified, it is cooled to below normal temperature and the cavity forming agent according to the invention is obtained. If edible emulsifiers, salt, flavors, colorants, spices, etc. are necessary, they are dissolved or diffused in water phase or edible oils and fats before being added.

The foods made by using the cavity forming agent according to the invention have cavities suitable for filling and films for preventing the transfer of the water and oil contained in the filling. Even when cavity bread is filled with meat sauce, fruit sauce, mayonnaise, etc. which have high water contents, water and oil do not transfer to the crumb part easily and the bread retains its initial good taste for a long time.

The cavity forming agent according to the invention can be used to make cake bread, steamed bread, French bread, country bread, soft rolls and doughnuts with cavities; cakes injected with jam or custard cream, chiffon cakes, butter cakes, sponge cakes and other cakes; and rice cakes, steamed buns, etc. with cavities for filling.

In order to obtain cavity foods with films for preventing the transfer of water and oil to the inside, 10%-30% by weight of the cavity forming agent according to the invention is wrapped in the dough of the above foods and baked or heated in the normal manner at a temperature higher than 100° C. This wrapping may be performed either by hand or using an "an" (bean jam) wrapping machine. The cavity forming agent wrapping dough may be molded into the desired shape.

In addition to forming cavities for filling, the cavity forming agent according to the invention may be used as follows: flavoring materials such as vegetables, fruits, nuts or those dried or crushed are added to the cavity forming agent, then the mixture is molded into a regular or irregular form of suitable size (about 1-2 cm$^3$) and mixed into the dough or scattered over dough sheet. Then, another dough sheet is placed on the above sheet and be gently pressed. Having cavities and taste a product, such as bread, obtained by baking such a dough is edible without further processing. These flavoring materials are not limited to those mentioned above—powdered processed foods such as cream, chocolate, jam, "an", etc. may be used for the same purpose. Such flavoring materials may be added at the desired ratio of 2% to 50% by weight, if necessary, within a range where the emulsified condition does not change.

EXAMPLES 1 TO 6 AND COMPARATIVE EXAMPLES 1 TO 8

Proteins, polysaccharides and phosphates or citrates were added to water at the mixing ratio in Table 1 and dissolved by heating to 85° C. and stirring. After adding edible oils and fats, this mixture solution was stirred at 85° C. for 10 minutes using a homomixer and cooled to 5° C., then 14 kinds (Examples 1 to 6 and Comparative Examples 1 to 8) of the cavity forming agent were obtained.

10 grams of the above cavity forming agent was wrapped in 50 g. of the dough of soft roll bread and this combination was baked at 200° C. for 12 minutes, producing cavity soft roll bread. Table 2 shows the measured values of its cavities and films as well as of transferred water.

The dough of soft roll bread was prepared as follows:

| Primary kneading: | |
|---|---|
| Bread flour: | 70 parts |
| Yeast: | 2.5 parts |
| water: | 40 parts |
| Mixed on final kneading: | |
| Bread flour: | 30 parts |
| Sugar: | 8 parts |
| Salt: | 1.6 parts |
| Skim milk: | 3 parts |
| Whole eggs: | 6 parts |
| Shortening: | 3 parts |
| Water: | 24 parts |

COMPARATIVE EXAMPLES 9 TO 10

Proteins and phosphates were added to water at the mixing ratio in Table 1 and dissolved by heating to 85° C. After adding edible oils and fats, this mixture was stirred at 85° C. using a homomixer and cooled to 5° C., producing 2 kinds (Comparative Examples 9 to 10) of cavity forming agent. 10 grams cavity forming agent was wrapped in 50 g. of the dough of soft roll bread and baked in the same manner as the above embodiments, producing soft roll bread. Table 2 shows the measured values of its cavities and films as well as of the amount of transferred water.

COMPARATIVE EXAMPLE 11

10 grams of Cheddar cheese was wrapped in 50 grams of the dough of soft roll bread and baked in the same manner as the above embodiments producing cavity soft roll bread. Table 2 shows measured values of its cavities and films as well as of the amount of transferred water.

TABLE 1

| Ingredient (in wt %) | Ex 1 | Ex 2 | Ex 3 | Ex 4 | Ex 5 | Ex 6 | Comp 1 | Comp 2 | Comp 3 | Comp 4 | Comp 5 | Comp 6 | Comp 7 | Comp 8 | Comp 9 | Comp 10 |
|---|---|---|---|---|---|---|---|---|---|---|---|---|---|---|---|---|
| Edible fat & oil | | | | | | | | | | | | | | | | |
| Beef tallow | 10 | 10 | | 5 | 7 | 20 | | 15 | 5 | 5 | | | | | 5 | |
| Hydrogenated fish oil (mp 32° C.) | | 10 | 10 | 5 | 3 | 5 | 3 | 5 | 10 | 10 | 10 | 10 | | | 10 | 5 |
| Hydrogenated soybean oil (mp 34° C.) | | 10 | 5 | 10 | 5 | | 2 | 10 | | | 5 | 5 | 20 | 20 | 5 | |
| Hydrogenated rapeseed oil (mp 32° C.) | | | | 5 | 10 | 5 | 2 | 5 | 5 | 5 | | | | | | 10 |
| Polysaccharide | | | | | | | | | | | | | | | | |
| Rice starch | 0.2 | | 2 | | | 4 | 4 | | | | 5 | 1 | 2 | | 2 | |
| Corn starch | 0.3 | 1 | | 4 | | | 2 | 1 | | | 1 | | | 2 | | |
| Lowcast bean gum | | | | | 2 | | 1 | | | | | | | | | |
| Guar gum | | | 1 | 2 | | 4 | | | | | 3 | 2 | 1 | | | |
| Arabic gum | 0.5 | | | 2 | | | | | | | | 1 | | | | |
| Xantene gum | | 1 | | | 2 | | 3 | | | | | | | | 2 | |
| Alginic acid | 0.5 | | 1 | | | 1 | | 3 | | | 5 | | 2 | 2 | | |
| Sodium alginate | | 1 | | 1 | | | | | | | | 2 | | | | |
| Pectin | | | 1 | | 1 | | | | | | 2 | | | | | |
| Carrageenan | | 1 | | 1 | | 1 | | | | | | | | | | |
| Sodium phosphate & sodium citrate | | | | | | | | | | | | | | | | |
| Disodium phosphate | | 1 | | 1 | 2 | 0.5 | 1 | | 2 | | 3 | 1 | | | 1 | 1 |
| Trisodium phosphate | 0.1 | 1 | 0.5 | | 1 | 3 | | 1 | | 2 | 2 | 2 | 2 | | 1 | 3 |
| Sodium pyrophosphate | | 1 | | 1 | | 0.5 | 1 | 1 | | | 2 | | | | 1 | 1 |
| Sodium hexamethaphosphate | | | 1 | | 1 | | 1 | | | | | | | | | |
| Sodium citrate | | | 0.5 | 0.5 | 1 | 1 | | 1 | | | | | | 1 | | |
| Protein | | | | | | | | | | | | | | | | |
| Rennet casein | 0.5 | 7 | 4 | 1 | | 10 | 3 | 5 | 10 | | 5 | 6 | | 5 | 10 | |
| Acid casein | 0.5 | 4 | 1 | 1 | 1 | | | | | 5 | | | | 5 | 5 | 5 |
| Soybean protein | | | 2 | 2 | 2 | 5 | 3 | | | 5 | 5 | | | 7 | 10 | |
| Wheat protein | | 2 | | 1 | 1 | | | 2 | | 2 | 2 | | | | | 5 |
| Skim milk powder | | | 5 | 2 | | | 2 | | 2 | | 1 | | | | | 5 |
| Water | 87.4 | 55 | 63 | 52.5 | 62 | 40 | 72 | 51 | 66 | 51 | 73 | 66 | 73 | 56 | 52 | 65 |

TABLE 2

| | State of Cavity | State of film (mm) | Water transfer test Upper crumb face (%) | Water transfer test Lower crumb face (%) | Hardness of film | Total judgment |
|---|---|---|---|---|---|---|
| Ex. 1 | ⊙ | 0.8 | 1.0 | 2.0 | 2.1 | ○ |
| Ex. 2 | ⊙ | 1.3 | 1.6 | 2.4 | 2.4 | ○ |
| Ex. 3 | ○ | 1.8 | 2.0 | 2.8 | 3.1 | X |
| Ex. 4 | ⊙ | 1.4 | 1.7 | 2.5 | 2.6 | ○ |
| Ex. 5 | ⊙ | 1.1 | 1.5 | 2.2 | 2.3 | ○ |
| Ex. 6 | ○ | 1.9 | 1.8 | 2.9 | 3.2 | X |
| Comp. Ex. 1 | ○ | 3.6 | 4.0 | 3.0 | 3.4 | X |
| Comp. Ex. 2 | Δ | 3.9 | 4.2 | 3.2 | 3.8 | X |
| Comp. Ex. 3 | ○ | 3.6 | 4.7 | 3.3 | 3.6 | X |
| Comp. Ex. 4 | Δ | 4.1 | 2.8 | 3.0 | 3.8 | X |
| Comp. Ex. 5 | Δ | 3.7 | 8.2 | 17.5 | 4.0 | X |
| Comp. Ex. 6 | Δ | 3.7 | 5.0 | 3.0 | 3.0 | X |
| Comp. Ex. 7 | X | 3.6 | 3.2 | 3.5 | 1.1 | X |
| Comp. Ex. 8 | Δ | 1.9 | 2.5 | 3.2 | 3.8 | X |
| Comp. Ex. 9 | Δ | 3.3 | 2.5 | 3.8 | 3.7 | X |
| Comp. Ex. 10 | Δ | 3.1 | 2.8 | 3.5 | 3.3 | X |
| Comp. Ex. 11 | Δ | 3.4 | 2.2 | 3.2 | 4.0 | X |

NOTES FOR TABLE 2

(1) State of Cavities

One liter of rapeseeds was prepared. Next, baked bread was put in a 1-liter measure, the spaces among the pieces of bread were filled by pouring in rapeseeds, and the volume of the remainder of the rapeseeds was measured to determine the volume of bread. Next, bread pieces were cut at the mid-point, the cut pieces were filled with rapeseeds, and their volume was measured to determine that of cavities.

The cavity ratio was calculated by using the following equation and cavities were classified by applying the following criteria.

$$\text{Cavity ratio (\%)} = \frac{\text{Volume of cavities}}{\text{Volume of bread}} \times 100$$

⊙: cavity ratio was at least 25%, and cavities located at center;
○: cavity ratio was at least 20% but less than 25%, and cavities located at center;
Δ: cavity ratio was at least 10% but less than 20%, and cavities did not locate at center;

X: cavity ratio was less than 10%, and cavities did not locate at center;

(2) State of Films

Baked bread was cut laterally and longitudinally into 4 pieces, then the thickness of films was measured at 4 points, up, down, right and left. The difference between the upper and lower limits of the thickness at the four points of the film has been indicated by numerical values.

(3) Water Transfer Test

Five pieces of bread containing yogurt were prepared by injecting 60 cc of commercially available yogurt into each piece of baked soft roll bread (48-50 g. per piece). At the same time five pieces of the standard soft roll bread, whose cavities were unfilled, were prepared. Both were made to stand at room temperature for 24 hours.

Water content is measured at different two parts each of 10 pieces of bread (5 pieces of bread with yogurt inside whereas 5 others remained without any material filled in the cavity). The two different parts mean:

one part (upper crumb face): the part in the crumb, 2-3 mm deep from the surface of upper inner-wall (cavity wall)

another part (lower crumb face): the part in the crumb, 2-3 mm deep from the surface of lower inner-wall (cavity wall).

Thus, water content is measured at totally 20 parts in ten pieces of bread by a micro moisture meter (two parts each per piece of bread respectively). The value of average water content of upper crumb faces obtained from 5 pieces of bread without fillings in the cavity (d) is subtracted from the value of the same part obtained from the 5 pieces of bread with yogurt filled in the cavity (c).

$$(c) - (d) \qquad (A)$$

Also, in the same manner, the value of the average water content of lower crumb faces obtained from 5 pieces of bread without fillings in the cavity (f) is subtracted from the value of the same part obtained from the 5 pieces of bread with yogurt filled in the cavity (e).

$$(e) - (f) \qquad (B)$$

Figures A and B are included in Table-2.

(4) Hardness of Film

A piece of baked bread was tasted by ten panellists. The hardness of the film was judged in accordance with the following criteria:

5 ... very hard
4 ... somewhat hard
3 ... somewhat soft
2 ... soft
1 ... very soft.

Results have been indicated by arithmetic mean values of the scores of the ten panellists. The softer the film, the better the quality.

As is described heretofore, the cavity forming agent according to the invention is composed of edible oils and fats, proteins, polysaccharides, phosphates and/or citrates, and water at specific ratios. Bread, cakes and other foods made using the cavity forming agent according to the invention have uniform cavities for easy filling and films for preventing the transfer of water and oil to the inside. The taste of such food is thus preserved and fillings with varied properties may be used. The invention is therefore effective in the preparation of a wide variety of processed foods.

We claim:

1. A cavity forming agent for edible foods wherein the food is selected from the group consisting of cakes and breads comprising by weight 10% to 30% edible oils and fats, 1% to 10% proteins, 1% to 10% polysaccharides, 0.1% to 5% phosphates, citrates or mixtures thereof, and 40% to 88% water, with the proteins selected from the group consisting of rennet casein, sodium caseinate, acid casein, soybean protein, wheat protein and skim milk powder.

2. The cavity forming agents for edible foods according to claim 1 wherein the edible oils and fats are selected from the group consisting of beef tallow, lard, coconut oil, cotton seed oil, palm kernel oil, soybean oil, rapeseed oil, palm oil, safflower oil, peanut oil, rice bran oil, the hydrogenated oils and fats obtained from the above edible oils and fats, hydrogenated fish oil, the solid oils and fats obtained by fractionating the above oils and fats, the liquid oils obtained by fractionating the above oils and fats, and the ester-interchange oils and fats obtained by ester-interchanging the above oils and fats.

3. The cavity forming agents for edible foods according to claim 1 wherein the polysaccharides are selected from the group consisting of locust bean gum, guar gum, carrageenan, Arabic gum, Xanthan gum, tamarind seed gum, alginic acid, sodium alginate, pectin, cornstarch, potato starch, sweet potato starch, rice starch, wheat starch and chemically-processed starches such as phosphated and hydrolyzed starch.

4. The cavity forming agents for edible foods according to claim 1 wherein the phosphate and citrate are selected from the group consisting of disodium phosphate, trisodium phosphate, tetrasodium phosphate, sodium hexametaphosphate, sodium tripolyphosphate, monosodium diphosphate, disodium diphosphate, trisodium diphosphate, tetrasodium diphosphate, sodium pyrophosphate, dipotassium phosphate, tripotassium phosphate, tetrapotassium phosphate, sodium aluminum phosphate, and sodium citrate.

5. A food product made with the cavity forming agent of claim 1 wherein the food product is selected from the group consisting of cakes and breads.

6. The food product of claim 5 wherein the food product is selected from the group consisting of cake bread, steamed bread, French bread, country bread, soft rolls, doughnuts, cakes with injected jam or custard cream, chiffon cakes, butter cakes, sponge cakes, rice cakes and steamed buns.

* * * * *

UNITED STATES PATENT AND TRADEMARK OFFICE
CERTIFICATE OF CORRECTION

PATENT NO. : 5,192,568
DATED : March 9, 1993
INVENTOR(S) : Kazuaki Yokoyama et al.

It is certified that error appears in the above-indentified patent and that said Letters Patent is hereby corrected as shown below:

In column 1, line 20, delete "dogs" and substitute therefor --dog--.

IN TABLE 1:

In column 5, under "Ingredient (in wt %)", line 13, delete "Lowcast" and substitute therefor --Locust--.

In column 5, under "Ingredient (in wt %)", line 16, delete "Xantene" and substitute therefor --Xanthan--.

In column 5, under "Ingredient (in wt %)", line 26, delete "hexamethaphosphate" and substitute therefor --hexametaphosphate--.

TABLE 2:

In column 7, line 57, delete "panellists" and substitute therefor --panelists--.

In column 8, line 2, delete "panellists" and substitute therefor --panelists--.

UNITED STATES PATENT AND TRADEMARK OFFICE
CERTIFICATE OF CORRECTION

PATENT NO. : 5,192,568
DATED : March 9, 1993
INVENTOR(S) : Kazuaki Yokoyama, et al It is certified that error appears in the above-indentified patent and that said Letters Patent is hereby corrected as shown below:

In column 8, line 12, delete "filings" and substitute therefor --fillings--.

Signed and Sealed this

Twenty-ninth Day of November, 1994

Attest:

BRUCE LEHMAN

*Attesting Officer*      *Commissioner of Patents and Trademarks*